No. 862,400. PATENTED AUG. 6, 1907.
F. JENSEN.
MAGNETIC TRANSMISSION MECHANISM.
APPLICATION FILED MAR. 15, 1905.
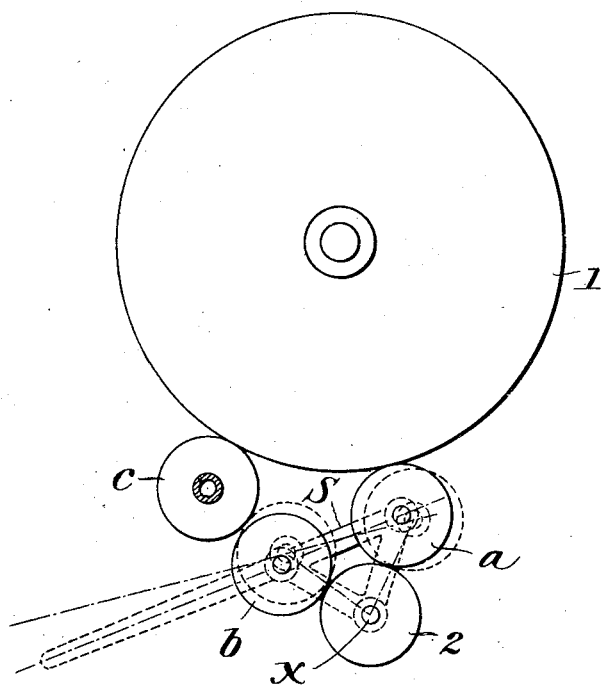
Witnesses:
James C. Babcock
Harry F. Ruth
Inventor,
Frantz Jensen
by
W. H. Babcock
Atty.

UNITED STATES PATENT OFFICE.

FRANTZ JENSEN, OF COPENHAGEN, DENMARK.

MAGNETIC TRANSMISSION MECHANISM.

No. 862,400.  Specification of Letters Patent.  Patented Aug. 6, 1907.

Application filed March 15, 1905. Serial No. 250,317.

*To all whom it may concern:*

Be it known that I, FRANTZ JENSEN, engineer, a citizen of Denmark, residing at Copenhagen, Store Kongensgade 35, in the Province of Leeland and Kingdom of Denmark, have invented certain new and useful Improvements in Magnetic Transmission Mechanism; and I do hereby declare the following to be a full, clear, and exact description of the invention, such as will enable others skilled in the art to which it appertains to make and use the same.

This invention relates to an electromagnetic reversing gear.

Reversing motors have the disadvantage of being complicated and not very economical in working. For this reason reversing engines have often been replaced by change gear, which, however, cannot be employed in cases where the power is great and the speed very high, except perhaps in that of belt gearing, which requires, however, a large amount of space.

The magnetic friction driving gear, which has been made use of in certain cases, but not in combination with reversing arrangements, enables the rotary motion of a shaft to be reversed even in cases where the power is great and the speed very high, and such a reversing arrangement constitutes the object of the present invention. At suitable places in the installation for effecting the transmission, rotary bodies with magnetic armatures are introduced, and the reversing is effected simply by certain of these magnets being excited, and others demagnetized, or, in the case of actual stoppage, all the electromagnets if necessary being put out of circuit. In other respects the reversing mechanism resembles the known change gears, consisting of two systems of rotary bodies, one of which is able to rotate the driven body in one direction, and the other to rotate it in opposite direction. Different forms of such gears are in use, but ordinarily the parts thereof by which power is transmitted are furnished with gear teeth. This is not the case with the combination which is the subject of this invention. The principal kinds of driving devices are according to the relative position of the shafts cylindrical, conical or formed by a rotating hyperbola. The present drawing, however, illustrates cylindrical bodies only, it being deemed unnecessary to show any others. Every system of reversing device may be applied, if only the magnets are suitably distributed in the electric circuit.

The accompanying drawing shows a reversing gear consisting of several rotary bodies.

In the drawing the one system of rotary bodies, which is able to rotate the roller 2 in one direction, is represented by the rollers 1, $a$ and 2 and the other system being able to rotate the body 2 in the other direction, by the bodies 1, $c$, $b$ and 2. The rotary body $a$ when in contact with driving body 1 constitutes, with it and driven body 2, a system of bodies in contact, adapted to turn body 2 forward. The rotary body $b$ when in contact with body $c$ constitutes with it and said bodies 1 and 2 an alternative system for driving body 2 backward. The frame S moves at will the body $a$ into contact with the body $l$ and the roller $b$ out of contact with body $c$, or vice versa. In the first case the power is transmitted from the wheel 1 through the wheel magnet $a$ to the wheel 2, while the wheel magnet $b$ is demagnetized. In the second case the power is transmitted to the shaft 2 through the wheel $c$ and the wheel magnet $b$, the magnets $a$ and $b$ being mounted in a movable frame S.

If the wheel magnet $a$ be magnetized it attracts by the wheel 1 and thereby transmission of power brought about. On the other hand, if the wheel magnet $b$ is excited, it will transmit the power from wheel 1 and wheel $c$ to the actuated body 2, being drawn by the attraction of drum or wheel 1 into contact with wheel $c$. If current is not passing through any of the wheel magnets, there will be no appreciable transmission of power.

The magnets may, of course, be distributed in another way. For instance the bodies 1 and 2 may be magnets, if the last is to be rotated in the same direction as the first, in the opposite case the bodies 2 and $c$ could serve as magnets. The principal thing is, that the magnets are so located as to produce magnetic fields of the necessary magnetic power.

It is obvious that, in practice, care will be taken as far as possible that the rotary bodies not participating in the transmission of power shall be quite stationary. The magnetic fields are as a rule so arranged, that each magnet adjoins at least one wheel which can close the magnetic circuit, but in case of a transmission of lesser power the circuit may be closed over one or more intermediate wheels, the north and south poles of which, however, in this case must not be conductively connected in the axial direction, as for instance the wheel $c$, which is fitted with a nonconducting boss for the magnetic current.

What I claim is:

1. In electromagnetic reversing gears the combination of the driving body and the driven body with intermediate devices constituting two alternative series for rotating said driven body forward or backward at will from said driving body, and means for making one or the other of said series operative, at least one of said intermediate devices being permanently in contact with said driven body substantially as set forth.

2. In reversing gears, the combination of the driving body and the driven body with intermediate devices constituting two alternative series for rotating said driven body forward or backward at will from said driving body and means for shifting said intermediate devices to make one or the other of said series operative, two of the said intermediate devices, respectively of different series, being permanently in contact with said driven body substantially as set forth.

3. In combination with driving wheel 1 and wheel $c$ permanently in contact therewith, the rocking frame S and the three wheels $a$ $b$ 2 mounted in said frame, all of the said wheels being magnetic, the wheels $a$ and $b$ being permanently in contact with the driven wheel 2 and permanently out of contact with each other, and the said frame and its wheels being arranged to make contact between wheel $a$ and driver wheel 1 when said frame is rocked in one direction and to make contact between wheel $b$ and wheel $c$ when said frame is rocked in the opposite direction substantially as and for the purpose set forth.

FRANTZ JENSEN.

Witnesses:
S. MENGELBERG,
FRED. ISHÖY.